US012753369B2

(12) United States Patent
Izmitli et al.

(10) Patent No.: US 12,753,369 B2
(45) **Date of Patent: *Oct. 6, 2026**

(54) CLEANING BOOSTER

(71) Applicants: Dow Global Technologies LLC, Midland, MI (US); Rohm and Haas Company, Collegeville, PA (US)

(72) Inventors: Aslin Izmitli, Spring City, PA (US); Michael C. Mitchell, Norristown, PA (US); Randara Pulukkody, Lansdale, PA (US); Muhunthan Sathiosatham, Chalfont, PA (US); Michael Tulchinsky, Midland, MI (US); Eric Wasserman, Collegeville, PA (US)

(73) Assignees: Dow Global Technologies LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 338 days.

This patent is subject to a terminal disclaimer.

(21) Appl. No.: 18/556,135

(22) PCT Filed: Jul. 13, 2022

(86) PCT No.: PCT/US2022/036888

§ 371 (c)(1),
(2) Date: Oct. 19, 2023

(87) PCT Pub. No.: WO2023/287837

PCT Pub. Date: Jan. 19, 2023

(65) Prior Publication Data

US 2024/0199993 A1 Jun. 20, 2024

Related U.S. Application Data

(60) Provisional application No. 63/222,450, filed on Jul. 16, 2021.

(51) Int. Cl.
*C11D 3/32* (2006.01)
*C11D 3/00* (2006.01)
(Continued)

(52) U.S. Cl.
CPC .......... *C11D 3/3723* (2013.01); *C11D 3/0036* (2013.01); *C11D 3/2082* (2013.01);
(Continued)

(58) Field of Classification Search
CPC ....... C11D 3/33; C11D 3/2082; C11D 3/2093; C11D 7/266; C11D 7/3245
(Continued)

(56) References Cited

U.S. PATENT DOCUMENTS 3,293,297 A 12/1966 Louvar et al.
4,108,922 A 8/1978 Crescentini et al.
(Continued)

FOREIGN PATENT DOCUMENTS

CN 107417904 12/2017
EP 0021431 1/1981
(Continued)

OTHER PUBLICATIONS

He, "Interfacial sciences in unconventional petroleum production: from fundamentals to applications." Chem. Soc. Rev. 2015, p. 5478-5480, vol. 44.

(Continued)

*Primary Examiner* — Gregory R Delcotto
(74) *Attorney, Agent, or Firm* — Thomas S. Deibert

(57) ABSTRACT

Cleaning booster for cleaning dirty laundry is provided, wherein the cleaning booster is of formula (I), wherein b is 0-2; wherein c is 2-4; wherein R is selected from hydrogen, $C_{1-22}$ alkyl and $—CH_2C(═O)R^{14}$; wherein $R^{14}$ is of formula (VI); wherein $R^1$ is selected from formula (II)-formula (V); (II) wherein $R^2$ is of formula (VI); (III) wherein $R^3$ is of formula (VI); and wherein $R^4$ is selected from hydrogen and methyl group; (IV) wherein $R^5$ is of formula (VI); wherein f is 1-2; and wherein g is 2-10; (V) wherein $R^6$ is of formula (VI); (VI) wherein $R^7$ is selected from hydrogen and $C_{1-22}$ alkyl group; wherein each $R^8$ and $R^9$ is independently a hydrogen or a $C_{1-2}$ alkyl group, with the proviso that at least one of $R^8$ and $R^9$ is hydrogen in each subunit a; and wherein a is 0-30.

(I)

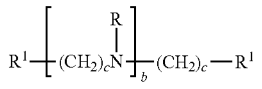

(II)

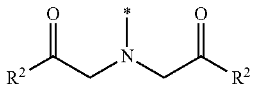

(III)

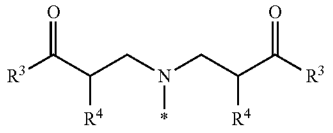

(IV)

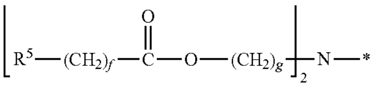

(V)

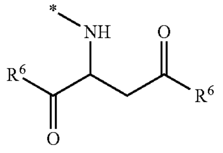

(VI)

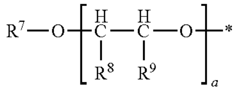

(Continued)

9 Claims, No Drawings

(51) Int. Cl.

| | |
|---|---|
| ***C11D 3/20*** | (2006.01) |
| ***C11D 3/30*** | (2006.01) |
| ***C11D 3/33*** | (2006.01) |
| ***C11D 3/37*** | (2006.01) |
| ***C11D 7/26*** | (2006.01) |
| ***C11D 7/32*** | (2006.01) |

(52) U.S. Cl.
CPC .............. *C11D 3/2093* (2013.01); *C11D 3/33* (2013.01); *C11D 7/266* (2013.01); *C11D 7/3245* (2013.01); *C11D 2111/12* (2024.01)

(58) Field of Classification Search
USPC .................................................. 510/499, 501
See application file for complete search history.

(56) References Cited

U.S. PATENT DOCUMENTS

| | | | | |
|---|---|---|---|---|
| 4,272,394 | A | 6/1981 | Kaneko | |
| 4,306,987 | A | 12/1981 | Kaneko | |
| 6,369,268 | B1 * | 4/2002 | Ehlis | C11D 1/46 564/511 |
| 7,884,137 | B2 | 2/2011 | Wang | |
| 8,759,276 | B2 | 6/2014 | Man et al. | |
| 9,605,163 | B2 | 3/2017 | Peera et al. | |
| 9,752,101 | B2 | 9/2017 | Loughnane et al. | |
| 10,472,596 | B2 * | 11/2019 | Lang | C11D 3/3765 |
| 11,028,344 | B2 * | 6/2021 | Chaudhari | C11D 3/2086 |
| 11,446,216 | B2 * | 9/2022 | Story | A61K 8/0216 |
| 2009/0005288 | A1 | 1/2009 | Boutique et al. | |
| 2010/0235776 | A1 | 9/2010 | Brown | |
| 2010/0261634 | A1 | 10/2010 | Misske et al. | |
| 2011/0152162 | A1 | 6/2011 | Schneiderman et al. | |
| 2011/0271458 | A1 | 11/2011 | Enselberg | |
| 2012/0149625 | A1 * | 6/2012 | Simonsen | C11D 3/38663 510/226 |
| 2013/0123162 | A1 * | 5/2013 | Souter | C11D 3/386 510/323 |
| 2013/0171210 | A1 | 7/2013 | Baker | |
| 2015/0091009 | A1 | 4/2015 | Yamazaki et al. | |
| 2015/0148890 | A1 | 5/2015 | Hartley et al. | |
| 2015/0329479 | A1 | 11/2015 | Ma et al. | |
| 2016/0289601 | A1 * | 10/2016 | Hodge | C11D 3/227 |
| 2016/0319226 | A1 * | 11/2016 | Lant | C11D 3/38636 |
| 2019/0390012 | A1 | 12/2019 | Hueffer et al. | |
| 2020/0140791 | A1 * | 5/2020 | Delaney | C11D 3/2044 |
| 2020/0299618 | A1 * | 9/2020 | Souter | C11D 3/38681 |

FOREIGN PATENT DOCUMENTS

| | | | |
|---|---|---|---|
| EP | 0794245 | 9/1997 | |
| WO | 03040281 | 5/2003 | |
| WO | 2013180730 | 12/2013 | |
| WO | 2018072979 | 4/2018 | |
| WO | WO-2021223222 A1 * | 11/2021 | C11D 3/2003 |

OTHER PUBLICATIONS

Levi, "Influence of structure of surface-active succinic acid-derivatives containing polyethylene-glycol groups on the properties of these compounds", Colloid Journal of the USSR, 1985, p. 303-308, vol. 47.

Tulu, "Synthesis and properties of hydrophilic polymers. Part 7. Preparation, characterization and metal complexation of carboxy-functional polyesters based on poly(ethylene glycol)", Polym. Int., 1999, p. 909-914, vol. 48.

* cited by examiner

CLEANING BOOSTER

The present invention relates to a cleaning booster for cleaning dirty laundry. In particular, the present invention relates to a cleaning booster for cleaning dirty laundry, wherein the cleaning booster is of formula (I)

(I)

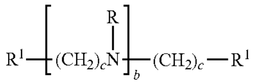

wherein b is 0 to 2; wherein c is 2 to 4; wherein each R is independently selected from the group consisting of a hydrogen, a $C_{1-22}$ alkyl group, an $R^1$ and a $—CH_2C(═O)R^{14}$ group;

wherein each $R^1$ is independently selected from the group consisting of formula (II), formula (III), formula (IV) and formula (V); wherein $R^{14}$ is of formula (VI);

(II)

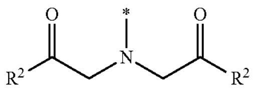

wherein the * indicates the point of attachment to formula (I); wherein each $R^2$ is independently of formula (VI);

(III)

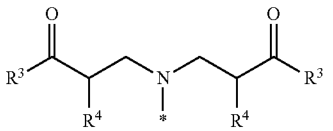

wherein the * indicates the point of attachment to formula (I); wherein each $R^3$ is independently according to formula (VI); and wherein each $R^4$ is independently selected from the group consisting of a hydrogen and a methyl group;

(IV)

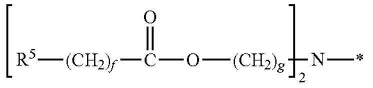

wherein the * indicates the point of attachment to formula (I); wherein each $R^5$ is independently according to formula (VI); wherein f is 1 to 2; and wherein g is 2 to 10;

(V)

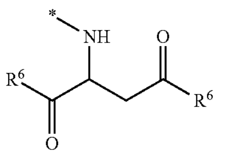

wherein the * indicates the point of attachment to formula (I); and wherein each $R^6$ is independently according to formula (VI);

(VI)

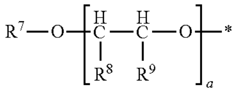

wherein the * indicates the point of attachment to the associated base formula; wherein $R^7$ is selected from the group consisting of a hydrogen and a $C_{1-22}$ alkyl group; wherein each $R^8$ and $R^9$ is independently selected from the group consisting of a hydrogen and a $C_{1-2}$ alkyl group, with the proviso that at least one of $R^8$ and $R^9$ is a hydrogen in each subunit a; and wherein a is 0 to 30.

Laundry detergents, particularly those in liquid and gel forms, providing excellent overall cleaning are desirable to consumers. Such laundry detergents typically include surfactants among other components to deliver the consumer desired cleaning benefits. Nevertheless, increasing sensitivity for the environment and rising material costs, a move to reduce the utilization of surfactants in laundry detergents is growing. Consequently, detergent manufactures are seeking ways to reduce the amount of surfactant per unit dose of the laundry detergent while maintaining overall cleaning performance.

One approach for reducing the unit dose of surfactant is to incorporate polymers into the liquid detergent formulations as described by Boutique et al. in U.S. Patent Application Publication No. 20090005288. Boutique et al. disclose a graft copolymer of polyethylene, polypropylene or polybutylene oxide with vinyl acetate in a weight ratio of from about 1:0.2 to about 1:10 for use in liquid or gel laundry detergent formulations having about 2 to about 20 wt % surfactant.

Notwithstanding, there remains a continuing need for cleaning boosters that facilitate maintained primary cleaning performance with reduced surfactant loading laundry detergent formulations (particularly in liquid or gel laundry detergent formulations); preferably, while also providing improved anti-redeposition performance. There is also a continuing need for new cleaning boosters with improved biodegradability according to OECD 301F protocol when compared with conventional cleaning boosters.

The present invention provides a cleaning booster for cleaning dirty laundry, wherein the cleaning booster is of formula (I)

(I)

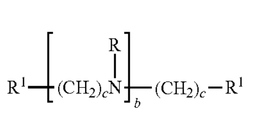

wherein b is 0 to 2; wherein c is 2 to 4; wherein each R is independently selected from the group consisting of a hydrogen, a $C_{1-22}$ alkyl group, an $R^1$ and a $—CH_2C(═O)R^{14}$ group;

wherein each $R^1$ is independently selected from the group consisting of formula (II), formula (III), formula (IV) and formula (V); wherein $R^{14}$ is of formula (VI);

(II)

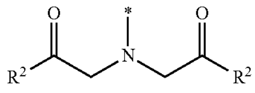

wherein the * indicates the point of attachment to formula (I); wherein each $R^2$ is independently of formula (VI);

(III)

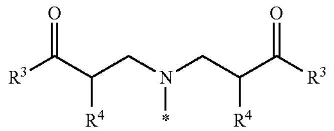

wherein the * indicates the point of attachment to formula (I); wherein each $R^3$ is independently according to formula (VI); and wherein each $R^4$ is independently selected from the group consisting of a hydrogen and a methyl group;

(IV)

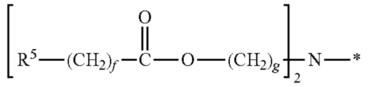

wherein the * indicates the point of attachment to formula (I); wherein each $R^5$ is independently according to formula (VI); wherein f is 1 to 2; and wherein g is 2 to 10;

(V)

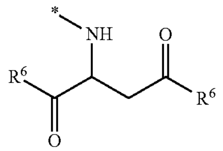

wherein the * indicates the point of attachment to formula (I); and wherein each $R^6$ is independently according to formula (VI);

(VI)

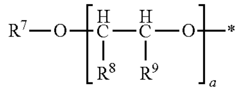

wherein the * indicates the point of attachment to the associated base formula; wherein $R^7$ is selected from the group consisting of a hydrogen and a $C_{1-22}$ alkyl group; wherein each $R^8$ and $R^9$ is independently selected from the group consisting of a hydrogen and a $C_{1-2}$ alkyl group, with the proviso that at least one of $R^8$ and $R^9$ is a hydrogen in each subunit a; and wherein a is 0 to 30.

The present invention provides a cleaning booster for cleaning dirty laundry, wherein the cleaning booster is of formula (I)

(I)

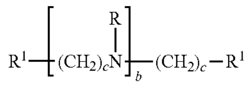

wherein b is 0 to 2; wherein c is 2 to 4; wherein each R is independently selected from the group consisting of a hydrogen, a $C_{1-22}$ alkyl group, an $R^1$ and a $—CH_2C(=O)R^{14}$ group;

wherein each $R^1$ is independently selected from the group consisting of formula (II), formula (III), formula (IV) and formula (V); wherein $R^{14}$ is of formula (VI);

(II)

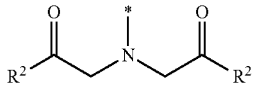

wherein the * indicates the point of attachment to formula (I); wherein each $R^2$ is independently of formula (VI);

(III)

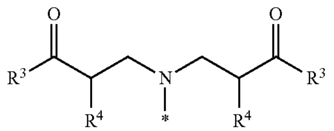

wherein the * indicates the point of attachment to formula (I); wherein each $R^3$ is independently according to formula (VI); and wherein each $R^4$ is independently selected from the group consisting of a hydrogen and a methyl group;

(IV)

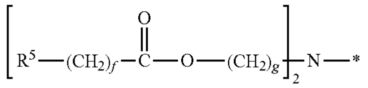

wherein the * indicates the point of attachment to formula (I); wherein each $R^5$ is independently according to formula (VI); wherein f is 1 to 2; and wherein g is 2 to 10;

(V)

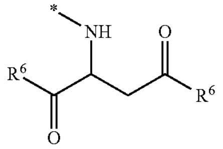

wherein the * indicates the point of attachment to formula (I); and wherein each $R^6$ is independently according to formula (VI);

(VI)

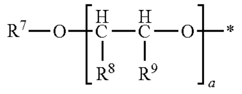

wherein the * indicates the point of attachment to the associated base formula; wherein $R^7$ is selected from the group consisting of a hydrogen and a $C_{1-22}$ alkyl group; wherein each $R^8$ and $R^9$ is independently selected from the group consisting of a hydrogen and a $C_{1-2}$ alkyl group, with the proviso that at least one of $R^8$ and $R^9$ is a hydrogen in each subunit a; wherein a is 0 to 30, with the proviso that a is 2 to 30 in 70 to 100 mol % of the occurrences of formula (VI) in the cleaning booster.

The present invention provides a cleaning booster for cleaning dirty laundry, wherein the cleaning booster is of formula (Ia)

(Ia)

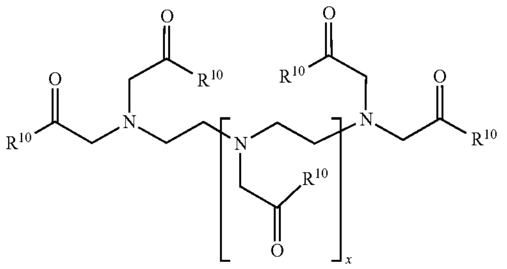

wherein x is 0 to 2; wherein each $R^{10}$ is independently of formula (VI).

The present invention provides a cleaning booster for cleaning dirty laundry, wherein the cleaning booster is of formula (Ia); wherein an average of 70 to 100 mol % of the $R^{10}$ groups in the cleaning booster are of formula (VI) wherein a is 2 to 30.

The present invention provides a cleaning booster for cleaning dirty laundry, wherein the cleaning booster is of formula (Ia); wherein an average of 70 to 100 mol % of the $R^{10}$ groups in the cleaning booster are of formula (VIa)

$$R^{11}—O—[CH_2CH(R^{12})O]_y—* \quad (VIa)$$

wherein the * indicates the point of attachment to formula (Ia); wherein $R^{11}$ is selected from the group consisting of a hydrogen and a $C_{1-22}$ alkyl group; wherein each $R^{12}$ is independently selected from the group consisting of a hydrogen and a $C_{1-2}$ alkyl group; and wherein y is 2 to 30.

The present invention provides a cleaning booster for cleaning dirty laundry, wherein the cleaning booster is of formula (Ia); wherein an average of 70 to 100 mol % of the $R^{10}$ groups in the cleaning booster are of formula (VIb)

$$R^{13}—O\text{-}(EO)_h—(PO)_i\text{-}(EO)_j—* \quad (VIb)$$

wherein the * indicates the point of attachment to formula (Ia); wherein $R^{13}$ is selected from the group consisting of a hydrogen and a $C_{1-12}$ alkyl group; wherein EO is an ethylene oxide group; wherein PO is a propylene oxide group; wherein h is 0 to 30; wherein i is 0 to 30; wherein j is 0 and 30; and wherein h+i+j is 2 to 30.

The present invention provides a laundry additive comprising a mixture of a cleaning booster of the present invention and water.

DETAILED DESCRIPTION

It has been surprisingly found that the cleaning boosters as described herein facilitate improvement in primary cleaning performance for sebum soil removal, while imparting good anti-redeposition performance for dust sebum and clay and also exhibiting desirable biodegradability profiles according to OECD 301F protocol.

Preferably, the cleaning booster for cleaning dirty laundry, of the present invention, is of formula (I)

(I)

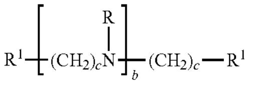

wherein b is 0 to 2 (preferably, 1); wherein c is 2 to 4 (preferably, 2); wherein each R is independently selected from the group consisting of a hydrogen, a $C_{1-22}$ alkyl group and a $—CH_2C(=O)R^{14}$ group (preferably, a hydrogen, a $C_{1-5}$ alkyl group and a $—CH_2C(=O)R^{14}$ group; more preferably, a hydrogen, a $C_{1-2}$ alkyl group and a $—CH_2C(=O)R^{14}$; still more preferably, a methyl and a $—CH_2C(=O)R^{14}$ group; most preferably, a $—CH_2C(=O)R^{14}$ group);

wherein $R^{14}$ is of formula (VI); and wherein each $R^1$ is independently selected from the group consisting of formula (II), formula (III), formula (IV) and formula (V) (preferably, formula (II) and formula (III); most preferably, formula (II));

(II)

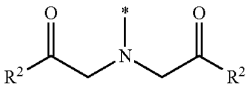

wherein the * indicates the point of attachment to formula (I); wherein each $R^2$ is independently of formula (VI) (i.e., the individual occurrences of $R^2$ in formula (II) can be the same or different from one another);

(III)

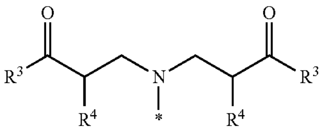

wherein the * indicates the point of attachment to formula (I); wherein each $R^3$ is independently according to formula (VI); and wherein each $R^4$ is independently selected from the group consisting of a hydrogen and a methyl group;

(IV)

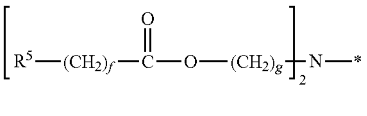

wherein the * indicates the point of attachment to formula (I); wherein each $R^5$ is independently according to formula (VI); wherein f is 1 to 2; and wherein g is 2 to 10;

(V)

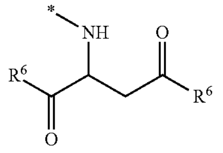

wherein the * indicates the point of attachment to formula (I); and wherein each $R^6$ is independently according to formula (VI);

(VI)

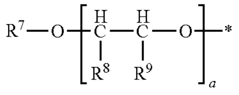

wherein the * indicates the point of attachment to the associated base formula (i.e., formula (II), formula (III), formula (IV) or formula (V)); wherein $R^7$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a hydrogen and a $C_{1-4}$ alkyl group; most preferably, a hydrogen and a $C_4$ alkyl group); wherein each $R^8$ and $R^9$ is independently selected from the group consisting of a hydrogen and a $C_{1-2}$ alkyl group, with the proviso that at least one of $R^8$ and $R^9$ is a hydrogen in each subunit a; and wherein a is 0 to 30 (preferably, with the proviso that a is 2 to 30 (preferably, 2 to 25; more preferably, 2 to 17; most preferably, 4 to 12) in 70 to 100 mol % (preferably, 80 to 100 mol %; more preferably, 90 to 100 mol %; most preferably, 95 to 100 mol %) of the occurrences of formula (VI) in the cleaning booster).

Preferably, the cleaning booster for cleaning dirty laundry, of the present invention, is of formula (I); wherein formula (I) is of formula (Ia)

(Ia)

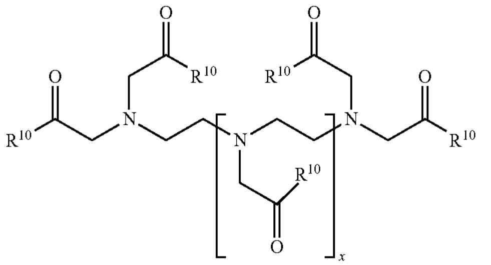

wherein x is 0 to 2 (preferably, 1); wherein each $R^{10}$ is independently of formula (VI)

(VI)

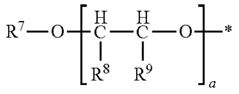

wherein the * indicates the point of attachment to formula (Ia); wherein $R^7$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a hydrogen and a $C_{1-4}$ alkyl group; most preferably, a hydrogen and a $C_4$ alkyl group); wherein each $R^8$ and $R^9$ is independently selected from the group consisting of a hydrogen and a $C_{1-2}$ alkyl group, with the proviso that at least one of $R^8$ and $R^9$ is a hydrogen in each subunit a; and wherein a is 0 to 30. More preferably, the cleaning booster of the present invention is of formula (I); wherein formula (I) is of formula (Ia); wherein an average of 70 to 100 mol % (preferably, 80 to 100 mol %; more preferably, 90 to 100 mol %; most preferably, 95 to 100 mol %) of the $R^{10}$ groups are of formula (VI) wherein a is 2 to 30. Still more preferably, the cleaning booster for cleaning dirty laundry of the present invention is of formula (I); wherein formula (I) is of formula (Ia); wherein an average of 70 to 100 mol % (preferably, 80 to 100 mol %; more preferably, 90 to 100 mol %; most preferably, 95 to 100 mol %) of the $R^{10}$ groups are of formula (VI); wherein formula (VI) is of formula (VIa)

$$R^{11}—O—[CH_2CH(R^{12})O]_y—* \quad (VIa)$$

wherein the * indicates the point of attachment to formula (Ia); wherein $R^{11}$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a $C_{1-4}$ alkyl group; most preferably, a $C_4$ alkyl group); wherein each $R^{12}$ is independently selected from the group consisting of a hydrogen and a $C_{1-2}$ alkyl group; and wherein y is 2 to 30 (preferably, 2 to 25; more preferably, 2 to 17; most preferably, 4 to 12). Most preferably, the cleaning booster for cleaning dirty laundry of the present invention is of formula (I); wherein formula (I) is of formula (Ia); wherein an average of 70 to 100 mol % (preferably, 80 to 100 mol %; more preferably, 90 to 100 mol %; most preferably, 95 to 100 mol %) of the $R^{10}$ groups are of formula (VI); wherein formula (VI) is of formula (VIb)

$$R^{13}—O—(EO)_h—(PO)_i—(EO)_j—* \quad (VIb)$$

wherein the * indicates the point of attachment to formula (Ia); wherein $R^{13}$ is selected from the group consisting of a hydrogen and a $C_{1-12}$ alkyl group (preferably, a hydrogen and a $C_{1-12}$ alkyl group; more preferably, a hydrogen and a $C_{1-5}$ alkyl group; still more preferably, a $C_{1-4}$ alkyl group; most preferably, a $C_4$ alkyl group); wherein EO is an ethylene oxide group; wherein PO is a propylene oxide group; wherein h is 0 to 30 (preferably, 0 to 5; more preferably, 0 to 2; most preferably, 0 to 1); wherein i is 0 to 30 (preferably, 0 to 10; more preferably, 0 to 7; most preferably, 2 to 5); wherein j is 0 and 30 (preferably, 2 to 10; more preferably, 2 to 8; most preferably, 2 to 6); and wherein h+i+j is 2 to 30 (preferably, 2 to 25; more preferably, 2 to 17; most preferably, 4 to 12).

Preferably, the laundry additive of the present invention comprises a mixture of a cleaning booster of the present invention and water. More preferably, the laundry additive of the present invention is a mixture comprising 0.1 to 99 wt % (preferably, 0.2 to 98 wt %; more preferably, 0.5 to 95 wt %; most preferably, 0.75 to 90 wt %), based on weight of the laundry additive, of a cleaning booster of the present invention; and 1 to 99.9 wt % (preferably, 2 to 99.8 wt %; more preferably, 5 to 99.5 wt %; most preferably, 10 to 99.25 wt %), based on weight of the laundry additive, of a water. Most preferably, the laundry additive of the present invention is a mixture comprising 0.1 to 99 wt % (preferably, 0.2 to 98 wt %; more preferably, 0.5 to 95 wt %; most preferably, 0.75 to 90 wt %), based on weight of the laundry additive, of a cleaning booster of the present invention; and 1 to 99.9 wt % (preferably, 2 to 99.8 wt %; more preferably, 5 to 99.5 wt %; most preferably, 10 to 99.25 wt %), based on weight of the laundry additive, of a water; wherein the laundry additive is a liquid (preferably, wherein the laundry additive is a liquid at 21° C. and 1 standard atmosphere of pressure).

Some embodiments of the present invention will now be described in detail in the following Examples.

Reagents used in the Examples are described in Table 1.

TABLE 1

| Identifier | Description |
| --- | --- |
| DTPA | Diethylenetriaminepentacetic acid (393.35 g/mol) available from TCI |
| Ethyl Alcohol | 200 proof available from Pharmco/Greenfield Global |
| Ethylene glycol monobutyl ether | available from The Dow Chemical Company under tradename BUTYL CELLOSOLVE ™ |
| Sulfuric acid | Certified ACS Plus, available from Fisher Scientific |
| AE1 | $C_{12-15}$ alcohol ethoxylate-9 (600 g/mol) available from Stepan Company under tradename BIO-SOFT ® N25-9 |
| AE2 | $C_{12-15}$ alcohol ethoxylate-7 (510 g/mol) available from Stepan Company under tradename BIO-SOFT ® N25-7 |
| Poly(ethylene glycol) | available from The Dow Chemical Company under tradename CARBOWAX ™ PEG 300 |
| Butylstannoic acid | available from OMC Organometallix under tradename FASCAT ® 9100 |
| EO | Ethylene oxide |
| PO | Propylene oxide |
| BO | Butylene oxide |
| Capryleth-6 carboxylic acid | available from Kao Chemicals under tradename AKYPO ® LF 1 |
| Titanium isopropoxide | available from Sigma Aldrich |
| Dimethyl maleate | 97% available from TCI Chemicals |

Synthesis S1: EQ-Terminated Block PO-Copolymer

Potassium hydride (0.5 g) was dissolved with stirring, under nitrogen, in ethylene glycol monobutyl ether (25 g). Of this mixture, 23.6 g was charged by syringe to a nitrogen-purged reactor. The reactor was sealed and then charged with propylene oxide (41.5 g; 50.0 mL) at 120° ° C. with a pumping rate of 1 mL/min. A reactor pressure increase was noted as the propylene oxide was added. The reactor contents were allowed to react with the addition of the propylene oxide for 9 hours; during which time the reactor pressure was observed to decrease and then leveled off as the propylene oxide was consumed. Then ethylene oxide (33.5 g; 38.0 mL) was charged to the reactor contents at 130° ° C. with a pumping rate of 1 mL/min. The reactor contents were allowed to react with the addition of the ethylene oxide for 4 hours. The reactor was then vented, purged with nitrogen, and the product was recovered. The yield was quantitative. 1H NMR ($CDCl_3$, δ, ppm): 0.90 t (3H, $CH_3$), 1.13 m (8.48H, $CH_3$ of PO), 1.35 m (2H, $CH_2$), 1.55 m (2H, $CH_2$), 3.55 m (35.93H, $CHCH_2$ of PO+$CH_2CH_2$ of EO). NMR analysis suggested the following formula for the recovered product: $CH_3CH_2CH_2CH_2OCH_2CH_2O(PO)_{2.83}(EO)_{5.36}H$. GPC (in THF): $M_n$=739, $M_w$=859, PDI=1.16. For the purposes of calculating reaction stoichiometries in the referenced Syntheses to follow, the FW calculated from the established above empirical formula from NMR was used: 519 Daltons.

Synthesis S2: EO-Terminated Block PO-Copolymer

Potassium hydride (0.4 g) was dissolved with stirring, under nitrogen, in ethylene glycol monobutyl ether (20.75 g). Of this mixture, 21.15 g was charged by syringe to a nitrogen-purged reactor. The reactor was sealed and then charged with propylene oxide (41.5 g; 50.0 mL) at 115° ° C. with a pumping rate of 1 mL/min. A reactor pressure increase was noted as the propylene oxide was added. The reactor contents were allowed to react with the addition of the propylene oxide for 22 hours; during which time the reactor pressure was observed to decrease and then leveled off as the propylene oxide was consumed. Then ethylene oxide (28.85 g; 33.0 mL) was charged to the reactor contents at 130° C. with a pumping rate of 1 mL/min. The reactor contents were allowed to react with the addition of the ethylene oxide for 4 hours. The reactor was then vented, purged with nitrogen, and the product was recovered. The yield was 85.4 g (93%). 1H NMR ($CDCl_3$, δ, ppm): 0.90 t (3H, $CH_3$), 1.13 m (11.05H, $CH_3$ of PO), 1.35 m (2H, $CH_2$), 1.55 m (2H, $CH_2$), 3.55 m (31.02H, $CHCH_2$ of PO+$CH_2CH_2$ of EO). NMR analysis suggests the following formula: $CH_3CH_2CH_2CH_2OCH_2CH_2O(PO)_{3.68}(EO)_{3.49}H$. GPC (in THF): $M_n$=641, $M_w$=761, PDI=1.19. For the purposes of calculating reaction stoichiometries in the examples to follow, the FW calculated from the established above empirical formula from NMR was used: 486 Daltons.

Synthesis S3: DTPA-Ethyl Ester Using Ethanol and Sulfuric Acid Catalyst

DTPA (8.5449 g), ethanol (168.54 g), and sulfuric acid (1.2000 g) were charged in an open atmosphere to a 500-mL flask containing a magnetic stir bar for stirring. Temperature of the flask contents was controlled by using a heating mantle connected to a variable transformer which was connected to a J-KEM temperature controller unit. The flask was fitted with an adapter connected to a three-way mineral oil bubbler that was connected to a nitrogen source in one neck. A condenser that circulates cold tap water was fitted to another neck of the flask. An alcohol thermometer was placed in another neck of the flask and configured to measure the headspace temperature. All necks of the flask were sealed with hydrocarbon grease. The charged and sealed apparatus was placed on top of a heating mantle which was placed on top of a magnetic stirrer. The flask was purged for the duration of the reaction with nitrogen at 2-3 bubbles per second as indicated by an inlet mineral oil bubbler. Seal quality was verified by an exit mineral oil bubbler connected to the condenser. The flask contents were heated to reflux (~78° ° C. headspace vapor temperature) and held with adequate mixing for a total of 19 hours over a period of several days (with heating and agitation stopped during overnight periods, which periods were not counted as part of the 19 hours). The flask contents were then filtered through paper using a Buchner funnel with vacuum assistance. Calcium carbonate (5.0 g) was added to the filtrate and allowed to stir for 30 minutes before filtering again using vacuum filtration. The filtrate was separated into 2 aliquots that were distilled sequentially. Approximately 100-150 mL of sample was placed in a 250-mL round bottom flask equipped with a magnetic stir bar and a vacuum distillation head and placed under nitrogen atmosphere with a steady nitrogen flow maintained with a bubbler. Distillation with solvent recovery was continued until the rate of solvent recovery slowed markedly. After the first half of the filtrate was subjected to distillation, the remainder of the filtrate was added and the distillation repeated. The product, DTPA-ethyl ester, was obtained as a dark orange-brown viscous liquid. 1H NMR (acetone-$d_6$, δ, ppm): 4.91-4.46 (1.87H), 4.37-4.24 (0.81H), 4.24-4.10 (5.83H), 4.01-3.91 (1.69H), 3.85-3.62 (10.68H), 3.64-3.54 (0.52H), 3.46-3.25 (3.55H), 2.14-1.92 (1.10H), 1.41-1.16 (13.15H), 1.16-1.06 (0.58H). DTPA:ethyl ester groups=1:4.13. DTPA-ethyl ester active: 98 wt %.

Synthesis S4: DTPA Polyester Using Ethoxylated Alcohol and Acid Catalyst

DTPA-ethyl ester prepared according to Synthesis S3 (1.0172 g, 2.0 mmol), AE1 (7.0486 g, 11.8 mmol, 6.0 eq.) and butylstannoic acid (0.0721 g, 0.35 mmol, 18 mol %) were charged to a 250 mL flask with a magnetic stir bar. The flask was sealed with hydrocarbon grease, purged with nitrogen and then heated in an OptiTHERM® Reaction Block attached to an IKA magnetic heating plate with a set point temperature of 150° C. After reaching 135° C., vacuum was applied to the flask contents via a mechanical pump with an intervening solvent trap cooled with a dry ice/acetone bath. The mixing speed was adjusted from a setting of 50 to 300 rpm as the contents of the flask were heated to account for changes in viscosity. The flask contents were held at a temperature of 145-158° C. for six hours under vacuum. The flask contents were then cooled and characterized. The extent of displacement of ethyl groups was estimated by integrated peaks in the quantitative 13C NMR spectra for the methyl groups of AE1 (14.4 ppm) and ethyl ester (14.6 ppm). This ratio was 6.7:1, and since the original ethyl: DTPA ratio was 4.13:1 and the AE1:DTPA ratio was 6.0, the ethyl:DTPA ratio in the product was 0.9:1 suggesting that ~80% of the ethyl groups had been eliminated.

Synthesis S5: DTPA Polyester Using Ethoxylated Alcohol, Diol and Acid Catalyst DTPA-ethyl ester prepared according to Synthesis S3 (0.9676 g, 1.9 mmol), AE1 (5.3243 g, 8.9 mmol, 4.8 eq.), PEG-300 (0.3712 g, 1.24 mmol, 0.65 eq.) and butylstannoic acid (0.0555 g, 0.27 mmol, 14 mol %) were charged to a 250 mL flask with a magnetic stir bar. The flask was sealed with hydrocarbon grease, purged with nitrogen and then heated in an OptiTHERM® Reaction Block attached to an IKA magnetic heating plate with a set point temperature of 150° C. After reaching 133.5° C., vacuum was applied to the flask contents via a mechanical pump with an intervening solvent trap cooled with a dry ice/acetone bath. The mixing speed was adjusted from a setting of 50 to 300 rpm as the contents of the flask were heated to account for changes in viscosity. The flask contents were held at a temperature of 142-149° ° C. for six hours under vacuum. The flask contents were then cooled and characterized. The extent of displacement of ethyl groups was estimated by integrated peaks in the quantitative 13C NMR spectra for the methyl groups of AE1 (14.4 ppm) and ethyl ester (14.6 ppm). This ratio was 4.6:1, and since the original ethyl:DTPA ratio was 4.13:1 and the AE1:DTPA ratio was 4.8:1, the ethyl: DTPA ratio in the product was 1:1 suggesting that ~75% of the ethyl groups had been eliminated.

Synthesis S6: DTPA Polyester Using Ethoxylated Alcohol and Acid Catalyst

DTPA-ethyl ester prepared according to Synthesis S3 (1.1378 g, 2.2 mmol), AE1 (6.9510 g, 13.7 mmol, 6.2 eq.) and butylstannoic acid (0.0798 g, 0.38 mmol, 17 mol %) were charged to a 250 mL flask with a magnetic stir bar. The flask was sealed with hydrocarbon grease, purged with nitrogen and then heated in an OptiTHERM® Reaction Block attached to an IKA magnetic heating plate with a set point temperature of 150° C. After reaching 120° C., vacuum was applied to the flask contents via a mechanical pump with an intervening solvent trap cooled with a dry ice/acetone bath. The mixing speed was adjusted from a setting of 50 to 300 rpm as the contents of the flask were heated to account for changes in viscosity. The flask contents were held at a temperature of 121-149° C. for seven hours under vacuum. The flask contents were then cooled and characterized. The extent of displacement of ethyl groups was estimated by integrated peaks in the quantitative 13C NMR spectra for the methyl groups of AE1 (14.4 ppm) and ethyl ester (14.6 ppm). This ratio was 6.5:1, and since the original ethyl:DTPA ratio was 4.13:1 and the AE1:DTPA ratio was 6.2:1, the ethyl:DTPA ratio in the product was 0.94:1 suggesting that ~75% of the ethyl groups had been eliminated.

Synthesis S7: DTPA-Penta Ethyl Ester Using Ethanol and Sulfuric Acid Catalyst DTPA (5.0008 g), ethanol (177.59 g), and sulfuric acid (1.2118 g) were charged in an open atmosphere to a 500-mL flask containing a magnetic stir bar for stirring. Temperature of the flask contents was controlled by using a heating mantle connected to a variable transformer which was connected to a J-KEM temperature controller unit. The flask was fitted with an adapter connected to a three-way mineral oil bubbler that was connected to a nitrogen source in one neck. A condenser that circulates cold tap water was fitted to another neck of the flask. An alcohol thermometer was placed in another neck of the flask and configured to measure the headspace temperature. All necks of the flask were sealed with hydrocarbon grease. The charged and sealed apparatus was placed on top of a heating mantle which was placed on top of a magnetic stirrer. The flask was purged for the duration of the reaction with nitrogen at 2-3 bubbles per second as indicated by an inlet mineral oil bubbler. Seal quality was verified by an exit mineral oil bubbler connected to the condenser. The flask contents were heated to reflux (~78° C. headspace vapor temperature) and held with adequate mixing for a total of 32 hours over a period of several days (with heating and agitation stopped during overnight periods, which periods were not counted as part of the 32 hours). The flask contents were then filtered through paper using a Buchner funnel with vacuum assistance. Calcium carbonate (5.0 g) was added to the filtrate and allowed to stir for 30 minutes before filtering again using vacuum filtration. The filtrate was separated into 2 aliquots that were distilled sequentially. Approximately 100-150 mL of sample was placed in a 250-mL round bottom flask equipped with a magnetic stir bar and a vacuum distillation head and placed under nitrogen atmosphere with a steady nitrogen flow maintained with a bubbler. Distillation with solvent recovery was continued until the rate of solvent recovery slowed markedly. After the first half of the filtrate was subjected to distillation, the remainder of the filtrate was added and the distillation repeated. The product, DTPA-ethyl ester, was obtained as a faint yellow translucent liquid. DTPA:ethyl ester groups=1:4.17. DTPA-ethyl ester active: 87 wt %.

Synthesis S8: DTPA Polyester Using Alkoxylated Butanol and Acid Catalyst

DTPA-ethyl ester prepared according to Synthesis S7 (1.0966 g, 1.86 mmol), EO-terminated block copolymer prepared according to Synthesis S1 (5.6161 g, 10.8 mmol, 5.8 eq.) and butylstannoic acid (0.0718 g, 0.34 mmol, 18 mol %) were charged to a 250 mL flask with a magnetic stir bar. The flask was sealed with hydrocarbon grease, purged with nitrogen and then heated in an OptiTHERM® Reaction Block attached to an IKA magnetic heating plate with a set point temperature of 150° C. After reaching 133.5° C., vacuum was applied to the flask contents via a mechanical pump with an intervening solvent trap cooled with a dry ice/acetone bath. The mixing speed was adjusted from a setting of 50 to 300 rpm as the contents of the flask were heated to account for changes in viscosity. The flask contents were held at a temperature of 133-148° C. for five hours under vacuum. The flask contents were then cooled and characterized. The extent of displacement of ethyl groups was estimated by integrated peaks in the quantitative 13C NMR spectra for the methyl groups of the product of Synthesis S1 (14.3 ppm) and ethyl ester (14.6 ppm). This ratio was 5.3:1, and since the original ethyl:DTPA ratio was 4.17:1 and the alkoxylate:DTPA ratio was 4.1:1, the ethyl: DTPA ratio in the product was 0.8:1 suggesting that ~80% of the ethyl groups had been eliminated.

Synthesis S9: DTPA-Penta Ethyl Ester Using Ethanol and Sulfuric Acid Catalyst

DTPA (8.0224 g), ethanol (304.80 g), and sulfuric acid (2.2318 g) were charged in an open atmosphere to a 500-mL flask containing a magnetic stir bar for stirring. Temperature of the flask contents was controlled by using a heating mantle connected to a variable transformer which was connected to a J-KEM temperature controller unit set at 85° C. The flask was fitted with an adapter connected to a three-way mineral oil bubbler that was connected to a nitrogen source in one neck. A condenser that circulates cold tap water was fitted to another neck of the flask. An alcohol thermometer was placed in another neck of the flask and configured to measure the headspace temperature. All necks of the flask were sealed with hydrocarbon grease. The charged and sealed apparatus was placed on top of a heating mantle which was placed on top of a magnetic stirrer. The flask was purged for the duration of the reaction with nitrogen at 2-3 bubbles per second as indicated by an inlet mineral oil bubbler. Seal quality was verified by an exit mineral oil bubbler connected to the condenser. The flask contents were heated to reflux (~79° C. headspace vapor temperature) and held with adequate mixing for a total of 20 hours over a period of several days (with heating and agitation stopped during overnight periods, which periods were not counted as part of the 20 hours). The flask contents were then filtered through paper using a Buchner funnel with vacuum assistance. Calcium carbonate (5.0 g) was added to the filtrate and allowed to stir for 30 minutes before filtering again using vacuum filtration. The filtrate was placed in a 500-mL round bottom flask equipped with a magnetic stir bar and a vacuum distillation head and placed under nitrogen atmosphere with a steady nitrogen flow maintained with a bubbler. Distillation with solvent recovery was continued until the rate of solvent recovery slowed markedly. The product, DTPA-ethyl ester, was obtained as a faint yellow translucent liquid. DTPA:ethyl ester groups=1:5. DTPA-ethyl ester active: 82 wt %.

Synthesis S10: DTPA Polyester

DTPA-ethyl ester prepared according to Synthesis S9 (4.1987 g, 6.48 mmol), EO-terminated block copolymer prepared according to Synthesis S1 (20.0 g, 38.5 mmol, 5.9 eq.) and titanium isopropoxide (0.3371 g, 1.19 mmol, 18 mol %) were charged to a 250 ml flask with a magnetic stir bar. The flask was sealed with hydrocarbon grease, purged with nitrogen and then heated in an OptiTHERM® Reaction Block attached to an IKA magnetic heating plate with a set point temperature of 150° C. After reaching 129° C., vacuum was applied to the flask contents via a mechanical pump with an intervening solvent trap cooled with a dry ice/acetone bath. The mixing speed was adjusted from a setting of 50 to 300 rpm as the contents of the flask were heated to account for changes in viscosity. The flask contents were held at a temperature of 150-152° C. for five hours under vacuum. The flask contents were then cooled and characterized. According to NMR, no ethyl groups remained in the 1H NMR spectra, and the 13C NMR showed that the carbonyl region is very simple with two peaks for the two types of esters at 168 ppm and 173 ppm.

Synthesis S11: Ester Synthesis

Capryleth-6 carboxylic acid (20.8032 g, 46.91 mmol based on nominal purity of 92%, 4.1 eq.), N,N,N',N'-tetrakis (2-hydroxyethyl)ethylenediamine (2.6629 g, 11.4 mmol) and titanium isopropoxide (0.5429 g, 1.9102 mmol, 17 mol %) were charged to a 250 mL flask with a magnetic stir bar. The flask was sealed with hydrocarbon grease, purged with nitrogen and then heated in an OptiTHERM® Reaction Block attached to an IKA magnetic heating plate with a set point temperature of 150° C. After reaching 120° C., vacuum was applied to the flask contents via a mechanical pump with an intervening solvent trap cooled with a dry ice/acetone bath. The mixing speed was adjusted from a setting of 50 to 300 rpm as the contents of the flask were heated to account for changes in viscosity. The flask contents were held at a temperature of 148.3-154.9° C. for 6.5 hours under vacuum. The flask contents were then cooled and characterized via NMR to confirm completion of reaction. 1H NMR (acetone-$d_6$, δ, ppm): 4.47-3.87 (15.2H), 3.87-3.25 (97.8H), 2.99-2.79 (4.3H), 2.79-2.35 (4.8H), 1.74-1.44 (8.1H), 1.44-1.14 (40.3H), 1.00-0.78 (12.0H). 13C NMR (126 MHZ, acetone-$d_6$, δ, ppm): 171.06 (2.2C), 73.36-70.07 (35.5C), 69.02 (2.7C), 63.49 (2.8C), 54.26 (2.8C), 32.66 (3.6C), 27.01 (3.3C), 23.39 (4.0C), 14.46 (4.0C).

Synthesis S12: Ethylenediamine-Methyl Acrylate Adduct

A 40 mL glass vial with a pressure relief cap and a magnetic stirrer was charged with methyl acrylate (8.6 g, 100 mmol) and methanol (4 mL). To the contents of the vial was slowly added ethylenediamine (1.5 g, 25 mmol). A slight exotherm was observed during the addition of amine.

The resulting solution was then placed on a block heater and stirred at 50 °C for seven hours. Progress of the reaction was monitored by 1H NMR spectroscopy. Upon complete conversion of amine to tetrasubstituted adduct, methanol was distilled off in a rotary evaporator to yield 9.3 g, 92% molar yield, of slightly viscous light yellow adduct.

Synthesis S13: Transesterification of Methyl Acrylate Adduct with Alkoxylated Butanol EO-terminated block copolymer prepared according to Synthesis S1 (10.3419 g, 13.99 mmol, 3.1 eq.), material prepared according to Synthesis S12 (1.8526 g, 4.58 mmol) and titanium isopropoxide (0.1733 g, 0.61 mmol, 13 mol %) were charged to a 250 mL flask with a magnetic stir bar. The flask was sealed with hydrocarbon grease, purged with nitrogen and then heated in an OptiTHERM® Reaction Block attached to an IKA magnetic heating plate with a set point temperature of 120° C. After reaching 44.4° C., vacuum was applied to the flask contents via a mechanical pump with an intervening solvent trap cooled with a dry ice/acetone bath. The mixing speed was adjusted from a setting of 50 to 300 rpm as the contents of the flask were heated to account for changes in viscosity. The flask contents were held at a temperature of 118.9-122.3 °C for six hours under vacuum. The flask contents were then cooled and characterized by NMR to confirm completion of the reaction.

Synthesis S14: Adduct from Methyl Acrylate and 3,3'-Diamino-n-Methyldipropylamine Methyl acrylate (8.6 g, 100 mmol) and methanol (4 mL) was charged to a glass vial with a magnetic stir bar and a pressure relief cap. N,N-bis(3-aminopropyl)methylamine (3.5 g, 24 mmol) was then slowly added to the contents of the vial. A slight exotherm was observed during the addition of amine. The resulting solution was then placed on a block heater and stirred at 50° C. for 4.5 hours. Progress of the reaction was monitored by 1H NMR spectroscopy. Upon complete conversion of amine to tetrasubstituted adduct, methanol was distilled off in a rotary evaporator to yield 11 g, 93.6% molar yield, of slightly viscous light yellow adduct.

Synthesis S15: Transesterification of Methyl Acrylate Adduct with Alkoxylated Butanol EO-terminated block copolymer prepared according to Synthesis S1 (10.0539 g, 19.3866 mmol, 4.4 eq.), material prepared according to Synthesis S14 (2.1746 g, 4.4 mmol) and titanium isopropoxide (0.1694 g, 0.5960 mmol, 13.6 mol %) were charged to a 250 mL flask with a magnetic stir bar. The flask was sealed with hydrocarbon grease, purged with nitrogen and then heated in an OptiTHERM® Reaction Block attached to an IKA magnetic heating plate with a set point temperature of 120° ° C. After reaching 86.4° C., vacuum was applied to the flask contents via a mechanical pump with an intervening solvent trap cooled with a dry ice/acetone bath. The mixing speed was adjusted from a setting of 50 to 300 rpm as the contents of the flask were heated to account for changes in viscosity. The flask contents were held at a temperature of 117.5-124.7° C. for nine hours under vacuum. The flask contents were then cooled and characterized by NMR to confirm completion of the reaction.

Comparative Examples $C_1$-$C_2$ and Examples 1-4: Liquid Laundry Detergent

The liquid laundry detergent formulations used in the cleaning tests in the subsequent Examples were prepared having the generic formulation as described in Table 2 with the cleaning booster as noted in Table 3 neutralized to a pH of 8.5 were prepared by standard liquid laundry formulation preparation procedures.

TABLE 2

| Ingredient | Commercial Name | wt % |
|---|---|---|
| Linear alkyl benzene sulfonate | Nacconal 90G* | 16.0 |
| Sodium lauryl ethoxysulfate | Steol CS-460* | 4.0 |
| Propylene glycol | — | 5.0 |
| Ethanol | — | 2.0 |
| Sodium citrate | — | 5.0 |
| Non-ionic surfactant | Biosoft N25-7* | 5.0 |
| Sodium xylenesulfonate | Stepanate SXS-93 | 5.5 |
| Fatty acid | Prifac 7908[a] | 3.0 |
| Cleaning Booster | — | 5.0 |
| Deionized water | — | QS to 100 |

*available from Stepan Company
[a]available from Croda

TABLE 3

| Example | Cleaning Booster |
|---|---|
| Comparative Example C1 | none |
| Comparative Example C2 | Alcohol ethoxylate[1] |
| Example 1 | Synthesis S5 |
| Example 2 | Synthesis S11 |
| Example 3 | Synthesis S10 |
| Example 4 | Synthesis S15 |

[1]available from Stepan Company under the tradename BIO-SOFT ® N25-9

Primary Cleaning Performance

The primary cleaning performance of the liquid laundry detergent formulations of Comparative Examples $C_1$-$C_2$ and Examples 1~4 were assessed in a Launder-Ometer (SDL Atlas, Model M228AA) at a set test temperature of 22° C. using an 18 minute wash cycle. Twenty of the 1.2 liter canisters were filled with 500 mL of hardness adjusted water at 100 ppm by mass with 2:1 Ca:Mg molar ratio were used for each run. The washed fabrics were rinsed in 300 mL of 100 ppm (2/1 Ca/Mg) hardness adjusted water at ambient temperature for 5 minutes at 260 osc/min pm on an Eberbach E6000 reciprocal shaker. The stained fabrics and soiled ballasts used in the tests were PCS-S-132 high discriminative sebum BEY pigment and PCS-S-94 sebum/dust ASTM stains from Testfabrics stitched to a pre-shrunk cotton interlock fabric. The size of the cotton interlock was 5×5 cm. The stained swatches were 2.5×3 cm. One 5×5 cm cut SBL-CFT soil ballast was added to each canister to provide baseline soil to the wash solution. The total surfactant concentration in the wash liquor was 200 ppm.

Reflectance measurement and Stain Removal Index (SRI)

The soil removal index (SRI) for each of the Liquid Laundry Detergent formulations evaluated in Primary Cleaning Performance Test were determined using ASTM Method D4265-14. The average SRI taken from 8 swatches per condition (two swatches per pot, 4 pots) is provided in Table 4.

The L*, a* and b* values of the stained fabrics were measured pre and post wash with a Mach 5 spectrophotometer from Colour Consult. The L*, a* and b* values for the unwashed, unstained polycotton fabric was measured in the SRI calculations as follows:

$$SRI = \frac{\left(\Delta E^*_{(US-UF)} - \Delta E^*_{(WS-UF)}\right)}{\Delta E^*_{(US-UF)}} \times 100$$

wherein US is the unwashed stain area, UF is the unwashed (unstained) fabric area, WS is the washed stain area, $\Delta E^*_{(US\text{-}UF)}$ is the $\Delta E^*$ color difference between the unwashed stain and the unwashed fabric and $\Delta E^*_{(WS\text{-}UF)}$ is the $\Delta E^*$ color difference between the washed stain and the unwashed fabric. The value of $\Delta E^*$ is calculated as $$\Delta E^* = \left(\Delta L^{*2} + \Delta a^{*2} + \Delta b^{*2}\right)^{1/2}$$

The ΔSRI values provided in Table 4 give the difference between the SRI measured for the noted example relative to the SRI measured for Comparative Example $C_1$. A positive value indicates an increase in soil removal relative to Comparative Example $C_1$.

TABLE 4

| | | ΔSRI | |
|---|---|---|---|
| Example | Cleaning Booster | PCS-94 | PCS-132 |
| Comparative Example C2 | Alcohol ethoxylate[1] | 4.37 | 2.65 |
| Example 1 | Synthesis S5 | 4.46 | — |
| Example 2 | Synthesis S11 | 2.24 | 2.09 |
| Example 3 | Synthesis S10 | 2.58 | 1.76 |
| Example 4 | Synthesis S15 | 5.69 | 3.99 |

[1]available from Stepan Company under the tradename BIO-SOFT ® N25-9

Comparative Examples $C_3$-$C_4$ and Examples 5-7: Liquid Laundry Detergent

The liquid laundry detergent formulation used in the cleaning tests in the subsequent Examples was prepared by combining 0.5 g of a standard liquid laundry detergent formulation with an adjusted pH of 8.5 as described in Table 5 with 1.5 g of a 1 w % aqueous solution of the cleaning booster noted in Table 6.

TABLE 5

| Ingredient | Commercial Name | wt % |
|---|---|---|
| Linear alkyl benzene sulfonate | Nacconal 90G* | 12 |
| Sodium lauryl ethoxysulfate | Steol CS-460* | 2 |
| Propylene glycol | — | 3.5 |
| Ethanol | — | 1.5 |
| Deionized water | — | QS to 100 |

*available from Stepan Company
[a]available from The Dow Chemical Company

TABLE 6

| Example | Cleaning Booster |
|---|---|
| Comparative Example C3 | None |
| Comparative Example C4 | Alcohol ethoxylate[1] |
| Example 5 | Synthesis S8 |
| Example 6 | Synthesis S11 |
| Example 7 | Synthesis S10 |

[1]available from Stepan Company under the tradename BIO-SOFT ® N25-9

Anti-Redeposition

The anti-redeposition performance of the combination of the standard liquid laundry detergent+cleaning booster of Comparative Examples $C_3$-$C_4$ and Examples 5-7 was assessed in a Terg-o-tometer Model 7243ES agitated at 90 cycles per minute with the conditions noted in Table 7.

TABLE 7

| Parameter | Setting |
|---|---|
| Temperature | 50° C. |
| Water hardness | 300 ppm, $Ca^{2+}/Mg^{2+}$ = 2/1 |
| Fabric Types | Cotton (C) |
| | Cotton interlock (CI) |
| | Cotton Terry (CT) |
| | Polyester: cotton blend (PB) |
| | Polyester knit (PK) |
| | Polyester woven (PW) |
| | two cloths of each type in each pot |
| Wash time | 60 minutes |
| Rinse time | 3 minutes |
| Liquid laundry detergent dosage | 0.5 g |
| Cleaning booster | 1.5 g of 1 wt % aqueous solution |
| Anti-redeposition soils | 2.5 g/L dust sebum |
| | 0.63 g/L Redart clay |
| Drying | After final rinse, fabrics were dried in a food dehydrator at 50° C. for 2 hours minutes |

The antiredeposition performance was determined by calculating the AE measured with a MACH 5+ instrument (L, a & b). The results are noted in Table 8, wherein $\Delta E^*$ is according to the equation $$\Delta E^* = \Delta E_{aw} - \Delta E_{bw}$$

wherein $\Delta E_{aw}$ is measured from fabrics after washing, and $\Delta E_{bw}$ is measured from fabrics before washing. A higher $\Delta E^*$ corresponds with better antiredeposition performance.

TABLE 8

| | ΔE* | | | | | |
|---|---|---|---|---|---|---|
| Example | CT | CI | CT | PB | PK | PW |
| Comp. Ex. C3 | 9.61 | 18.80 | 16.56 | 12.61 | 24.62 | 16.87 |
| Comp. Ex. C4 | 10.22 | 19.15 | 21.06 | 12.27 | 23.80 | 14.99 |
| Example 5 | 9.55 | 16.82 | 13.33 | 13.17 | 25.05 | 15.39 |
| Example 6 | 7.48 | 15.68 | 15.27 | 13.28 | 24.03 | 17.17 |
| Example 7 | 8.18 | 16.67 | 14.19 | 14.03 | 28.66 | 18.64 |

We claim:

1. A cleaning booster for cleaning dirty laundry, wherein the cleaning booster is of formula (I)

(I)

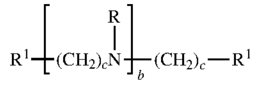

wherein b is 0 to 2; wherein c is 2 to 4; wherein each R is independently selected from the group consisting of a hydrogen, a $C_{1-22}$ alkyl group, an $R^1$ and a $-CH_2C(=O)R^{14}$ group; wherein $R^{14}$ is of formula (VI); and wherein each $R^1$ is independently selected from the group consisting of formula (II), formula (III), formula (IV) and formula (V)

(II)

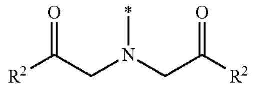

wherein the * indicates the point of attachment to formula (I); wherein each $R^2$ is independently of formula (VI);

(III)

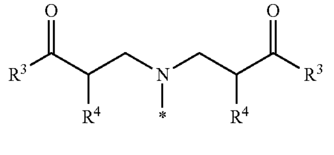

wherein the * indicates the point of attachment to formula (I); wherein each $R^3$ is independently according to formula (VI); and wherein each $R^4$ is independently selected from the group consisting of a hydrogen and a methyl group;

(IV)

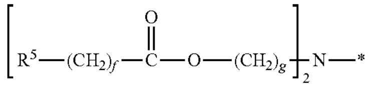

wherein the * indicates the point of attachment to formula (I); wherein each $R^5$ is independently according to formula (VI); wherein f is 1 to 2; and wherein g is 2 to 10;

(V)

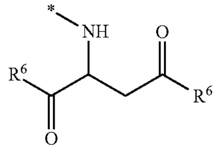

wherein the * indicates the point of attachment to formula (I); and wherein each $R^6$ is independently according to formula (VI);

(VI)

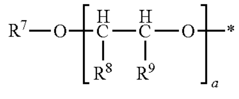

wherein the * indicates the point of attachment to the associated base formula; wherein $R^7$ is selected from the group consisting of a hydrogen and a $C_{1-22}$ alkyl group; wherein each $R^8$ and $R^9$ is independently selected from the group consisting of a hydrogen and a $C_{1-2}$ alkyl group, with the proviso that at least one of $R^8$ and $R^9$ is a hydrogen in each subunit a; and wherein a is 0 to 30, with the proviso that a is 2 to 30 in 70 to 100 mol % of the occurrences of formula (VI) in the cleaning booster.

2. The cleaning booster of claim 1, wherein the cleaning booster of formula (I) is of formula (Ia)

(Ia)

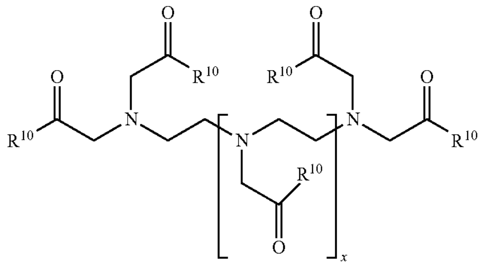

wherein x is 0 to 2; wherein each $R^{10}$ is independently of formula (VI).

3. The cleaning booster of claim 2, wherein 70 to 100 mol % of the $R^{10}$ groups in the cleaning booster are of formula (VIa)

$$R^{11}—O—[CH_2CH(R^{12})O]_y—* \qquad \text{(VIa)}$$

wherein the * indicates the point of attachment to formula (Ia); wherein $R^{11}$ is selected from the group consisting of a hydrogen and a $C_{1-22}$ alkyl group; wherein each $R^{12}$ is independently selected from the group consisting of a hydrogen and a $C_{1-2}$ alkyl group; and wherein y is 2 to 30.

4. The cleaning booster of claim 2, wherein 70 to 100 mol % of the $R^{10}$ groups in the cleaning booster are of formula (VIb)

$$R^{13}—O—(EO)_h—(PO)_i—(EO)_j—* \qquad \text{(VIb)}$$

wherein the * indicates the point of attachment to formula (Ia); wherein $R^{13}$ is selected from the group consisting of a hydrogen and a $C_{1-12}$ alkyl group; wherein EO is an ethylene oxide group; wherein PO is a propylene oxide group; wherein h is 0 to 30; wherein i is 0 to 30; wherein j is 0 and 30; and wherein h+i+j is 2 to 30.

5. The cleaning booster of claim 4, wherein x is 1.

6. The cleaning booster of claim 5, wherein $R^{13}$ is a $C_{1-4}$ alkyl group.

7. The cleaning booster of claim 6, wherein h is 0 to 1; wherein i is 2 to 5; and wherein j is 2 to 6.

8. A laundry additive comprising a mixture of a cleaning booster of claim 1 and water.

9. The laundry additive of claim 8, wherein the laundry additive is a liquid.

* * * * *